United States Patent
Kelling

[15] 3,684,874
[45] Aug. 15, 1972

[54] AUTOMATIC CUTTER COMPENSATION FOR CONTOURING CONTROL SYSTEMS

[72] Inventor: Leroy U. C. Kelling, Waynesboro, Va.

[73] Assignee: General Electric Company

[22] Filed: Dec. 23, 1970

[21] Appl. No.: 100,871

[52] U.S. Cl.............................235/151.11, 307/265
[51] Int. Cl........................G05b 19/02, G05b 15/02
[58] Field of Search.... .............................235/151.11

[56] References Cited

UNITED STATES PATENTS 3,449,554  6/1969  Kelling.................235/151.11

*Primary Examiner*—Eugene G. Botz
*Attorney*—William S. Wolfe, Frank L. Neuhauser, Oscar B. Waddell and Joseph B. Forman

[57] ABSTRACT

A numerical contouring control system including improvements in the technique of cutter compensation. The basic control system includes a contouring function generator for generating the desired contouring path and a compensating function generator for continuously realigning the offset compensation vector with the angle of the commanded path. A program slope pulse generator is connected to the contouring function generator so as to generate pulses proportional to the contents of the contouring function generator. A tool radius slope pulse generator is connected to the compensating function generator so as to generate pulses proportional to the contents of the compensating function generator. The outputs of the tool radius slope pulse generator and the program slope pulse generator are compared. If these outputs are found to be unequal, the contents of the compensating function generator are modified so as to automatically keep the tool offset vector aligned with the angle of the contouring path.

16 Claims, 4 Drawing Figures

INVENTOR.
LEROY U.C. KELLING
BY Michael Masnik
HIS ATTORNEY

INVENTOR.
LEROY U.C. KELLING
BY Michael Masnik
HIS ATTORNEY

INVENTOR.
LEROY U.C. KELLING
BY Michael Masnik
HIS ATTORNEY

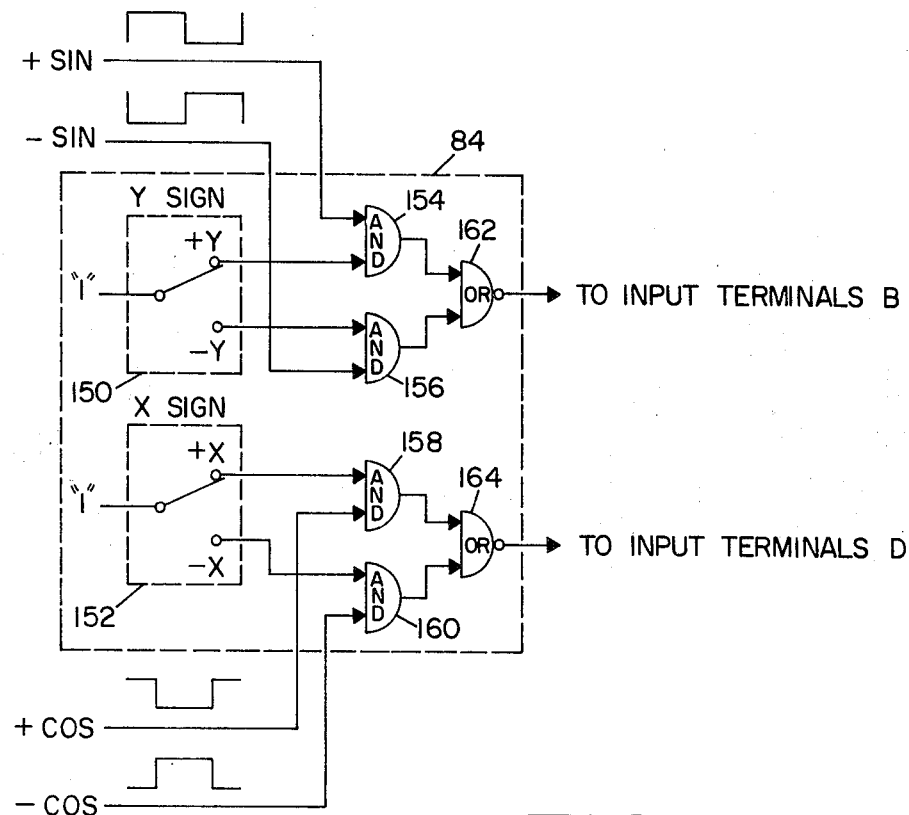
FIG. 4
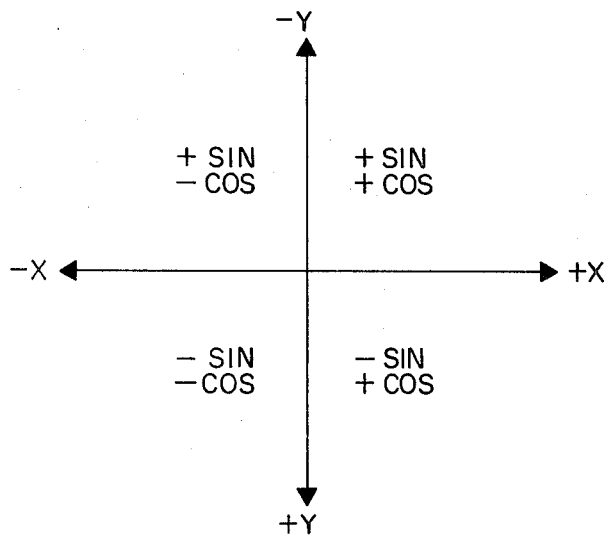

AUTOMATIC CUTTER COMPENSATION FOR CONTOURING CONTROL SYSTEMS

BACKGROUND OF THE INVENTION

The present invention relates to numerical control systems for machine tools. More specifically, the invention relates to a cutter compensation system capable of compensating for a cutter of improper size.

The development of numerical control systems for machine tools is well known. There are, however, a variety of types of numerical control systems which utilize various control techniques. Chief, however, among the techniques for controlling the actual position of a machine tool are numerical control systems which fall into two main categories. These two categories are broadly referred to as numerical positioning controls and numerical contouring controls.

Numerical positioning controls define the desired end position of the numerically controlled machine tool by setting forth the desired end position in terms of coordinates, either absolute or relative to the last indicated position. The actual path traveled by the numerically controlled machine from one position to the next is generally of no importance in numerical positioning controls since the tool generally moves at some position away from the work until such time as it arrives at the desired end position and the machining operation begins.

Numerical contouring controls, on the other hand, are programmed in terms of the desired path which the numerically controlled machine tool is to follow as it moves from one commanded position to the next. Numerical contouring control systems are generally used by machines such as lathes, boring mills, etc., in which the cutting tool is in actual contact with the workpiece as the cutting tool moves from one commanded position to the next. Therefore, it will be apparent that the path which a machine controlled by a numerical contouring control follows is of critical importance.

As mentioned hereinbefore, it is relatively common to use numerical contouring controls on machine tools which have some type of rotating cutter as exemplified by a milling machine. It will be apparent that the actual surface machined is a function not only of the movement of the rotating cutter but also a function of the size of the rotating cutter. Therefore, it is common practice to program the desired machine tool path with respect to the center of the rotating cutter and then require that the cutter itself have certain carefully defined dimensions, particularly the cutter radius, so that the part conforms to pre-established dimensional requirements. However, if a cutter of a different size is used, either as a result of tool wear or of the unavailability of the cutter initially called for, the final workpiece will be improperly sized.

It has heretofore been known to provide offset compensation so as to allow a numerical contouring control system to compensate for differences in cutter size. One example of such a system is shown in U.S. Pat. No. 3,449,554 of the present inventor, assigned to the assignee of this invention.

Briefly, the invention set forth in the aforesaid patent is characterized by the fact that it includes two function generators, a contouring function generator of the type normally used in contouring control systems and an additional compensating function generator. The ordinary contouring function generator is used to generate the desired path for the cutting tool and the compensating function generator is used to generate compensating pulses which offset the cutting tool in the necessary direction so as to take into account any deviation in cutter size.

The offset compensation system of the aforesaid patent has met with widespread acceptance and use in the numerical control industry. However, this type of offset compensation system has one notable disadvantage in that it requires the input data to the system to provide a continuous program path. That is, the compensation system begins by putting the initial input data in both the contouring function generator and the compensating function generator. Thereafter it is necessary to assure that each succeeding block of data has an instantaneous initial slope which corresponds to the final slope of the last previous block of data. Thus, in a part which is composed of a series of straight lines, it is necessary to program small circular arcs between these straight lines so as to provide a continuous path.

A brief review of the aforesaid patent reveals that this type of programming is necessary since a significant deviation in slope from one block of data to the next requires an initial change in the position of the cutting tool since the effect of cutter variation will necessarily need to be accounted for in different axes of the controlled machine depending upon the slope of the particular path being machined.

The aforesaid disadvantage of this system was, in large part, however, accommodated by the fact that most numerical machine tool users utilized some type of automated programming so that the input data were used by the control system automatically provided for the necessary programming requirements, i.e., a continuous path. However, with the increased utilization of numerical control, it has become desirable to make numerical contouring control systems including offset compensation available to other users who may not have access to such a sophisticated manner of part programming. In addition, programming arcs between straight line segments so as to rotate the tool has caused some machining problems in the area of surface finish and so on.

SUMMARY OF THE INVENTION

It is an object of the present invention to provide a novel contouring control system which compensates for irregularities in cutting tool dimension.

It is a further object of the present invention to provide such a novel contouring control system which automatically realigns the compensation between discontinuous segments of the contouring path.

It is a still further object of the present invention to provide a novel pulse modulation system which generates an output signal proportional to the frequency of a pulse frequency digital signal modulated by an input modulation signal.

It is a still further object of the present invention to provide a novel pulse modulation scheme for modulating first and second pulse frequency signals and generating a phase varying output signal which is proportional to the pulse frequencies of the first and second pulse frequency signals.

Briefly stated, the present invention includes a contouring function generator and a compensating function generator. The contouring and compensating function generators have associated therewith two additional function generators which generate pulse trains that are proportional to the contents of the contouring and compensating function generators. These pulse trains are compared in order to indicate whether the output of the additional function generators are equal. In case these outputs are unequal, the contents of the compensating function generator is modified as a result of this comparison so as to realign the tool offset compensation with the angle of the commanded contouring path. In one embodiment, the comparison takes place by alternatively counting the outputs of the function generators and monitoring the state of the counted pulses. In another embodiment, the comparison takes place by generating two phase varying signals and comparing the phase thereof so as to indicate whether or not the outputs are equal.

BRIEF DESCRIPTION OF THE DRAWINGS

While the specification concludes with claims particularly pointing out and distinctly claiming the subject matter which is regarded as the invention, an illustration of several particular embodiments can be seen by referring to the specification in connection with the accompanying drawings in which:

FIG. 4 is a detailed logic diagram of the quadrant selector of FIG. 2.

DESCRIPTION OF THE PREFERRED EMBODIMENTS

Figure 1:
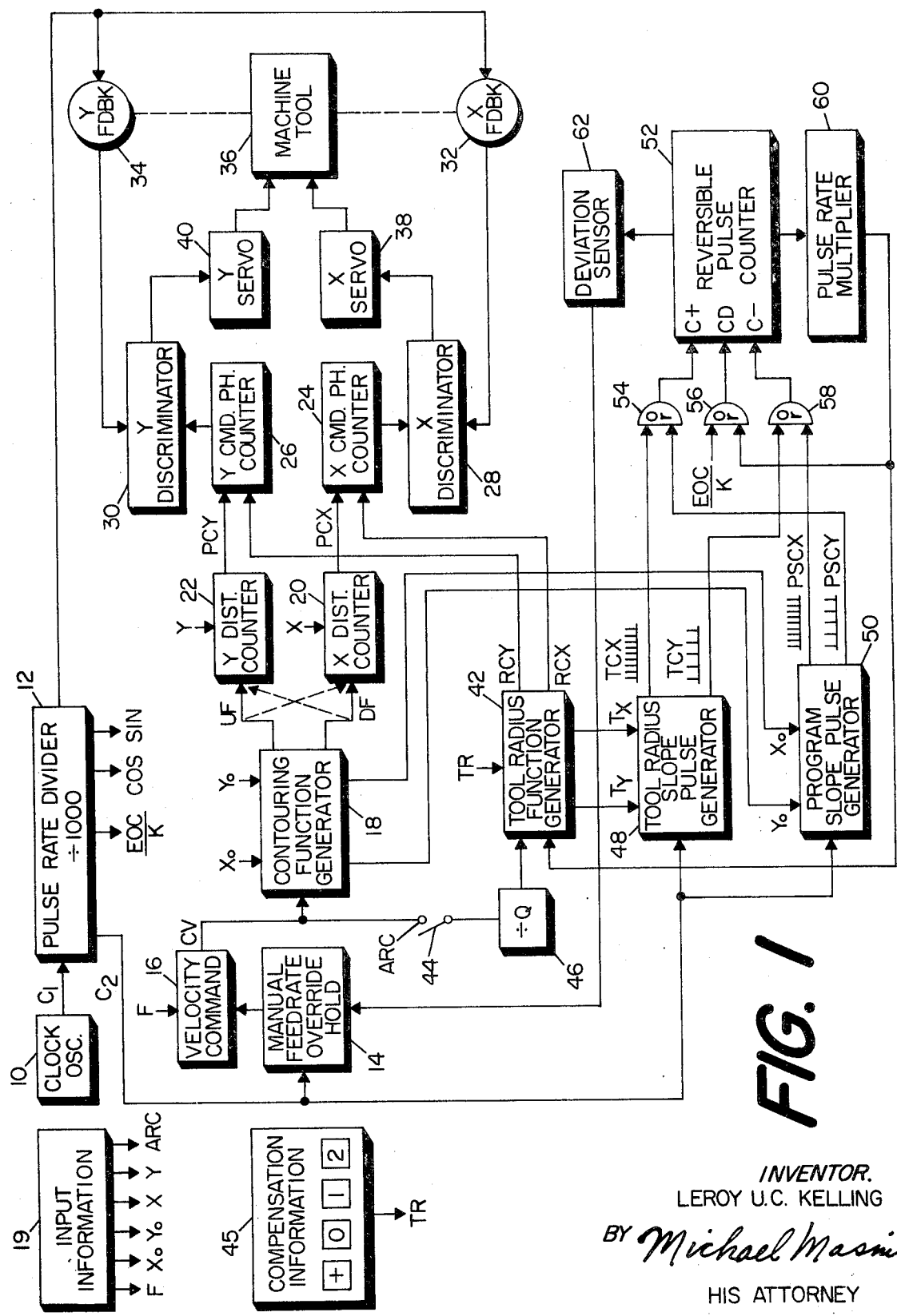
FIG. 1 is a detailed block diagram of a first embodiment of the novel contouring control system of the present invention.

Turning now to FIG. 1, there is shown a detailed block diagram of a numerical contouring control system including a first embodiment of the improvement comprising the present invention.

The basic control system of FIG. 1 includes a master clock oscillator 10 which generates a substantially constant high frequency signal, such as 250 khz. The master clock output signal labeled $C_1$ is utilized throughout the numerical contouring system so as to synchronize the operation of various functions which are carried out therein.

The output of the clock oscillator 10 is fed to a pulse rate divider 12 which is used to break down the basic clock signal $C_1$ into a variety of different time-varying signals for use within the system. The many signals generated by the pulse rate divider 12 will not be discussed at this time but rather will be referred to from time to time during the operation of the control system.

The first signal of interest is the output signal from the pulse rate divider 12 labeled $C_2$. This signal is used in many placed in the control system and may be, for example, a simple division of the basic output signal from the clock oscillator 10. Output signal $C_2$ is fed to a first block labeled "Manual Feedrate Override" 14. The manual feedrate override 14 is a standard function provided in numerical contouring control systems and is generally a manually selectable function which allows the machine operator to vary the actual cutting speed of the machine if he feels that the cut presently being performed is taking place either too fast or too slow.

The output of the manual feedrate override 14 is fed to a velocity command 16. The velocity command 16 is used to control the speed of the commanded path. Thus, it has indicated as its input the letter F which, along with the other information indicative of the desired machine operation comes from some input information means 19. The input information means 19 will generally constitute a tape or card reader with the basic program for the machine tool being stored in punched tape or cards or magnetic tape format.

The output of the velocity command 16 is a signal labeled CV which is to represent the contouring velocity. This output signal will be a function of the output of the manual feedrate override 14 and the desired path speed which is programmed under the letter F. In general, it can be said that the frequency of the signal CV is directly proportional to the desired path speed.

The contouring velocity pulses from the velocity command 16 are fed to a contouring function generator 18. The basic function of the contouring function generator 18 is to separate the contouring velocity pulses from the velocity command 16 into two components to be utilized to control the movable axes of the controlled machine tool.

The desired division which takes place in the contouring function generator 18 is, at least initially, determined by the input information which is delineated $X_o$ and $Y_o$ and is commonly referred to as the X and Y offset information. A detailed description of the various types of functions which can be generated by the contouring function generator 18 is not appropriate in the description of the present invention but it will be appreciated that contouring function generators can take many different forms and the types of numerical function generators vary.

The output signals from the contouring function generator 18 are labeled UF and DF and represent the results of dividing the contouring velocity signal CV into the two components relating to the movement of the two machine axes. These two output pulse signals are fed to two distance counters, the X distance counter 20 and the Y distance counter 22. The function of the distance counters 20, 22 is to terminate a particular step when the contouring path has been traversed over the desired length. Once again, the input information means 19 will indicate the desired length of the path to be traversed with this information being noted with the symbols X and Y thereby indicating the amount of travel desired in the two respective axes of the controlled machine tool. The UF and DF pulses which were fed to the X and Y distance counters 20, 22 are also fed to an X command phase counter 24 and a Y command phase counter 26. At this point in the block diagram, these pulses have been referred to as the PCX and PCY signals but it will be understood that these two signals are selected from the two outputs of the contouring function generator 18 since they relate to the desired motion of the controlled machine tool. The X and Y command phase counters 24, 26 are known in the art with an example of a command phase counter for this type of operation being shown in FIG. 5 of the abovecited U.S. Pat. No. 3,449,554.

Briefly, the function of the command phase counters 24, 26 is to accept the input pulses PCX and PCY and generate therefrom two phase varying signals whose phase is proportional to the frequency and direction of the input pulses PCX and PCY. Thus, the phase varying output signal from the Y command phase counter 26 is a phase varying signal which is indicative of the desired position and velocity of the Y axis of the controlled machine tool. Similarly, the phase varying output signal from the X command phase counter 24 is a phase varying output signal indicative of the desired position and velocity of the other or X axis of the controlled machine tool.

The phase varying outputs of the X and Y command phase counters 24, 26 are fed, respectively, to an X discriminator 28 and a Y discriminator 30. The other inputs to the X and Y discriminator 28, 30 come, respectively, from an X feedback unit 32 and a Y feedback unit 34. The X and Y feedback units 32, 34 are mechanically or otherwise coupled to the controlled machine tool 36 so as to reflect the present position and velocity of these two controlled axes. The particular form which the X and Y feedback units 32, 34 may take is not important to the present invention but it will be noted in passing that there are a variety of such feedback units including rotary selsyns and linear transducers which would be excited by an output from the pulse rate divider 12 so as to provide a reference input signal.

Thus, the function of the X discriminator 28 is to examine the difference between the desired position of the X axis (indicated by the output of the X command phase counter 24) and the actual position of the X axis (as indicated by the output of the X feedback unit 32). Similarly, the function of the Y discriminator 20 is to ascertain the difference between the desired position of the Y axis (as indicated by the phase varying output signal from Y command phase counter 26) and the actual position of the Y axis (as indicated by the output of the Y feedback unit 34).

The phase discrimination which takes place in the X and Y discriminators 28, 30 will result in generating some type of output signal which indicates the difference between the actual and the commanded positions of these two controlled axes. Thus, the output of the X discriminator 28 may be, for example, a DC signal whose amplitude is proportional to the present difference between the actual and commanded positions of the X axis. For this reason, the output of the X and Y discriminators 28, 30 are fed, respectively, to an X servo 38 and a Y servo 40. The function of the X and Y servos 38, 40 is to take the output of the X and Y discriminators 28, 30 and convert these outputs into power signals which are used to move the controlled machine tool axes. The types of servo units which can be employed vary widely from small motors excited by SCR drives to large hydraulic control systems employing hydraulic motors or cylinders. In any event, the output of the X servo 38 is fed to the machine tool 36 so as cause the X axis of machine tool 36 to move in the desired direction. Similarly, the output of the Y servo 40 is also fed to the machine tool 36 so as to cause the Y axis of the controlled machine tool to move in the desired direction.

From the foregoing, it can be seen that a contouring control system of the well known type operates to command the motion of a controlled machine tool along the desired path so as to machine the requisite part geometry. The foregoing has been no more than a brief description of a conventional numerical contouring control system of the well known type. From this description, it can be seen that a machine tool utilizing a rotating cutter will follow the programmed path but will not be capable of compensating in any way for any discrepancies in the desired dimension of the cutting tool.

One way in which the system of FIG. 1 as described thus far can be supplemented so as to compensate for discrepancies in cutting tool dimension has already been pointed out in the above-cited U.S. Pat. No. 3,449,554. In the system described in that patent, there is provided an additional function generator referred to as the compensating function generator and illustrated by the tool radius function generator 42 of FIG. 1. The purpose of the tool radius function generator 42 is to accept compensating information as, for example, from some compensating information input means 45, such as manually operable thumb-wheel switches which are preset by the machine tool operator to indicate any deviation in cutter geometry and to generate from this input information means compensating pulses which will assure that the discrepancies in the cutting tool geometry are compensated for. As pointed out in the aforementioned U.S. Pat. No. 3,449,554 it is only necessary to provide such compensating information during the course of a machine operation if the contour being machined is other than a linear contour. For this reason, there is provided a switch 44 which will be closed when the input information indicates that a circular or ARC function is being generated.

The output of the arc switch 44 is fed to a simple frequency divider 46 whose output is, in turn, fed to the tool radius function generator 42. The function of the frequency divider 46 is to accommodate for any differences in the length of the registers used in the two function generators 18, 42. Since the tool radius function generator 42 and the contouring function generator 18 are both activated by the output of the velocity command 16, it will be apparent that the operation of these two function generators is inherently synchronous so as to continually vary the angle at which the cutting tool is offset during the generation of a contouring path. Finally, the tool radius function generator 42 can be of any well known type such as those referred to hereinbefore with respect to the contouring function generator 18.

The outputs of the tool radius function generator 42 are labeled RCY and RCX. These two output signals are fed respectively to the Y command phase counter 26 and the X command phase counter 24 so as to assure that the compensation takes place during the generation of a nonlinear function. In this fashion the amount of compensation required is continually shifted from one axis to the other as the desired numerical function is generated.

As described thus far, the contouring control system of FIG. 1 is no more than the system shown in detail in U.S. Pat. No. 3,449,554. For this reason, the explanation thus far has necessarily been somewhat limited since a full teaching of a system of this type is shown in the abovecited patent.

The compensating control system described thus far has been widely used in various numerical control applications. While it has been successful in accommodating the troublesome aspects of cutter tool deviations, it has a singular limitation in that the control system itself must be programmed such that the path followed is essentially continuous. That is, if one step in the path is a straight line, and that step is followed by a second straight line having a different slope, the system described thus far requires that a small arc be programmed between these two slopes so as to rotate the cutting tool from one particular displacement to another before continuing along the second linear path. The remainder of the system of FIG. 1 is specifically provided so as to obviate the need for programming in a continuous fashion in that the additional functions provided in FIG. 1 will automatically rotate the cutting tool between discontinuous segments in the part geometry.

In order to permit the contouring control system of FIG. 1 to automatically realign the cutting tool so as to compensate for geometric irregularities in the part geometry, there are provided a third function generator 48 and a fourth function generator 50. The third function generator 48 is connected to the tool radius function generator 42 so that the contents of the tool radius slope pulse generator 48 will be the same as the contents of the tool radius function generator 42. Similarly, the program slope pulse generator 50 is connected to the contouring generator 18 so that the contents of the program slope pulse generator 50 will be the same as the contents of the contouring function generator 18. It will be apparent that since the contents of the contouring and tool radius function generators 18, 42 are continually changing as a particular part geometry program is executed, it will be necessary to continually update the contents of the tool radius and program slope pulse generators 48, 50. The precise details as to how this continual updating takes place is not shown in FIG. 1 since it will depend in part upon the precise type of control system utilized as well as the speed and desired accuracy of the computations that take place.

In order to activate the tool radius and program slope pulse generators 48, 50 they are connected to the pulse rate divider 12, specifically to the output signal $C_2$. The output signal $C_2$ is a relatively high frequency signal which will cause the tool radius and program slope pulse generators 48, 50 to compute at a relatively high rate. That is, the contouring and tool radius function generators 18, 42 compute at a rate determined by the output of the velocity command 16. Since this output signal CV is at a rate substantially below $C_2$, it would be appreciated that the tool radius and program slope pulse generators 48, 50 will operate at a markedly higher rate.

The precise form of the tool radius and program slope pulse generators 48, 50 may vary from application to application but it has been found that the particular numerical function generator described in copending U.S. Pat. application Ser. No. 82,979, filed Oct. 22, 1970 (GE Docket 44-NU-01118) of the present inventor and assigned to the assignee of the present invention works particularly well in this setting. A singular advantage of this particular type of function generator is that it is continually putting out pulses so as to increase the rate at which output pulses are generated by the tool radius and program slope pulse generators 48, 50. An additional condition for the successful operation of this pulse counting comparison means is that the combined total of the output signals TCX plus TCY must be equal to the combined totals of the output signals PSCX plus PSCY. This said condition is maintained by having the third function generator 48 and the fourth generator 50 each be the type which puts out one output pulse on either output for each input pulse $C_2$.

The function of the tool radius slope pulse generator 48 is to generate first and second pulse trains labeled TCX and TCY. These two pulse trains result from dividing the input signal $C_2$ into two components which are proportional to the information stored within the tool radius slope pulse generator 48. This information, since it comes from the tool radius function generator 42, is at all times proportional to the present angle at which the compensating information is presently being offset relative to the two axes of the controlled machine tool. In order for the system of FIG. 1 to operate properly, the offset information must be synchronized with the output of the contouring function generator 18 and changes in the angle of one must necessarily be accompanied by changes in the angle of the other. For this reason, the program slope pulse generator 50 is connected to the contouring function generator 18 so as to generate third and fourth pulse trains labeled PSCX and PSCY. These two pulse trains are proportional to the contents of the program slope pulse generator 50 which, since it gets its information from the contouring function generator 18, makes these two pulse trains proportional to the present angle of the numerical function being generated as the part program is executed.

In order to automatically align the output of the tool radius function generator 42 with the output of the contouring function generator 18, it will be necessary to vary the contents of the tool radius function generator 42 whenever the contents of the contouring function generator 18 are changed so as to call for a new path segment which has a slope which differs from the preceding path segment. At the same time, it will also be necessary to accomplish a corresponding rotation of the cutting tool so as to realign the tool vector in the appropriate direction. Thus, one can determine whether the tool vector is in line with the the angle of the commanded path by examining the outputs of the tool radius and program slope pulse generators 48, 50. This is done by comparison means in FIG. 1 including a reversible pulse counter 52. The reversible pulse counter 52 has three inputs. The first is labeled C+, the second C− and the third CD. Each time the signal applied to the C+ input terminal of reversible counter 52 goes to logic "1", the contents of the reversible pulse counter 52 will be increased by a predetermined amount. Similarly, each time the input terminal C− goes to logic "1", the contents of the reversible pulse counter 52 will be decreased by one. Finally, each time the input terminal labeled CD goes to logic "1", the absolute value of the number (whether positive or negative) stored in the reversible pulse counter 52 will be decreased by one.

The actual details of construction of the reversible pulse counter 52 of FIG. 1 is largely a matter of design choice. These details will be apparent and need not be shown in detail for the purpose of explanation of the present invention.

In order to form its necessary comparison function the reversible pulse counter 52 of FIG. 1 has three OR gates 54, 56, 58 associated therewith. OR gate 54 is connected to the tool radius slope pulse generator 48 so as to receive the output signal TCX thereof. The other input to OR gate 54 comes from the program slope pulse generator 50 so as to receive the output signal PSCY thereof. Under these circumstances it will be apparent that the reversible pulse counter 52 will count in the positive direction whenever a pulse is generated on either the TCX or PSCY outputs of the tool radius slope pulse generator 48 and the program slope pulse generator 50, respectively.

Similarly, the C— input terminal of reversible counter 52 has OR gate 58 associated therewith. The first input to OR gate 58 comes from the tool radius slope pulse generator 48 so as to receive the output signal TCY and the second input to OR gate 58 comes from the program slope pulse generator 50 so as to receive the output signal PSCX. Under these circumstances it will be apparent that the contents of reversible pulse counter 52 will be decreased each time there is a signal present on either of these two outputs.

Briefly, analysis of the connection described thus far reveals that the contents of the reversible pulse counter 52 will not change so long as the vector of the tool radius and the angle of the programmed path are equal. That is, the contents of reversible pulse counter 52 will remain substantially constant if the combined total of the pulses on output signals TCX and PSCY are equal to the combined total of the pulses on output signals TCy and PSCX. If, however, this equality does not exist there is an indication that the tool vector needs to be realigned so as to conform to the present angle of the programmed path. This inequality will be detected by a change in the state of the number present in the reversible pulse counter 52. That is, reversible pulse counter 52 will either count in the positive or negative direction since the equality referred to above does not exist if the tool vector does not align with the angle of the programmed tool path. Under these circumstances, a continually increasing (or decreasing) number will be stored in reversible counter 52. The presence of some non-zero number in reversible pulse counter 52 means that the contents of the tool radius function generator 42 must be altered so as to realign the tool vector with the angle of the programmed path.

This is accomplished by a pulse rate multiplier 60 of the well known type which is operatively connected to the reversible pulse counter 52. Briefly, the operation of the pulse rate multiplier 60 is such that it will generate an output signal whose frequency is proportional to the absolute number stored in reversible pulse counter 52. The output pulses from the pulse rate multiplier 60 are fed to a second input on the tool radius function generator 42 so as to modify the numbers stored therein in the required direction to realign the tool radius vector with the present angle of the programmed path.

Each time a pulse is generated by the pulse rate multiplier 60 it will be necessary to modify the present contents of the reversible pulse counter 52. This is accomplished by connecting the output of the pulse rate multiplier 60 to one input of OR gate 56 which is, in turn, connected to the CD input of reversible pulse counter 52. In this way, the contents of the reversible pulse counter 52 will be continuously brought up to date so as to properly realign the tool radius vector with the angle of the programmed path.

The second input to OR gate 56 is connected to the pulse rate divider 12 so as to receive a signal denoted EOC/K which is a periodically occurring pulse frequency signal which functions together with the output of the pulse rate multiplier 60 to stabilize the action of the reversible pulse counter 52 so as to prevent continuous oscillation of the tool radius function generator 42 in searching for the precise angular correspondence with the contouring function generator 18. This additional input signal is necessary since both the tool radius function generator and the reversible pulse counter 52 act as digital integrators which have associated with them a certain amount of phase shift which tends to establish regulating system instability. The effect of the additional pulse supplied to OR gate 56 is to improve the control system phase margin and decrease any tendency toward system instability.

The system as explained thus far will operate satisfactorily to realign the tool radius vector with the angle of the programmed path wherever the discontinuities in the programmed path tend to be relatively small angles. However, it will be appreciated that there are circumstances where a significantly larger angle is involved and the operation of the system as explained thus far may result in some inaccuracies at the initial part of the second step in the path until such time as the system has been able to realign the tool radius vector with the new angle of the contoured path.

In order to allow the contouring control system of FIG. 1 to compensate for large discontinuities in the angle of the contoured path, there is provided a deviation sensor 62. The deviation sensor 62 monitors the contents of the reversible pulse counter 52 until such time as the number stored in the reversible pulse counter 52 becomes large enough to indicate that there is a significant difference between the outputs of the tool radius slope pulse generator 48 and the programmed slope pulse generator 50. This large difference is indicative of a substantial amount of difference in the angle between the two segments of the command path requiring some special action at this time.

Accordingly, the output of the deviation center 62 is connected to the manual feed rate override 14 so as to "hold" further operation in the main part of the control system until such time as the tool radius function generator 42 can be rotated to bring the vector of the tool radius more nearly in line with the angle of the commanded path. The specific form of the deviation sensor 62 is of no real significance in the present invention since it can comprise, for example, some type of comparison circuit which simply monitors the contents of the reversible counter 52 and indicates when the contents of reversible pulse counter 52 exceeds a predetermined amount. As soon as the contents of the tool radius function generator 42 has been modified so as to reduce the contents of the reversible pulse counter 52, the output of deviation sensor 62 will change so as to permit operation to continue since at this time the tool radius vector will be more nearly in line with the actual programmed angle of the tool path.

Briefly summarizing, the operation of the contouring control system of FIG. 1 is as follows. Input information from the information means 19 is distributed throughout the main portion of the control system so as to indicate the desired speed, type, and direction of the path to be followed by the controlled machine tool 36. At the same time, compensating information relating to the size of the cutting tool is fed from the compensating information input means 45 to the compensating function generator 42. As the desired tool path is commanded by the contouring function generator 18, the tool radius function generator 42 continues to rotate the tool radius vector so as to keep the cutting tool itself aligned with the angle of the commanded path. At the end of each block of information, a new block of information defining the next segment of the machining operation is fed from the information input means to the main control system. If the new segment of path is not continuous with the initial segment, that is, the slope of the new path is different than the final slope of the old path, it will be necessary to correct the contents of the tool radius function generator 42 so as to reposition the tool radius vector with respect to the angle of the newly commanded path.

This is accomplished by comparing the outputs of the tool radius slope pulse generator 48 and the program slope pulse generator 50 in the comparison means embodied in the reversible pulse counter 52 and its associated gating. If there is a difference between the tool radius vector and the angle of the commanded path, the pulse rate multiplier 60 generates pulses in a direction and at a frequency proportional to the difference. These pulses are fed to the tool radius function generator 42 so as to change its contents and appropriately orient the tool radius vector until it is aligned with the angle of the commanded path. If the angle of the newly commanded path differs substantially from the angle of the previous path, then the deviation sensor 62 operates to temporarily inhibit further operation until the tool radius function generator 42 has been corrected so as to bring the tool radius vector substantially into alignment with the angle of the newly commanded path at which time operation and continual realignment of the tool radius vector will be resumed.

Figure 2:
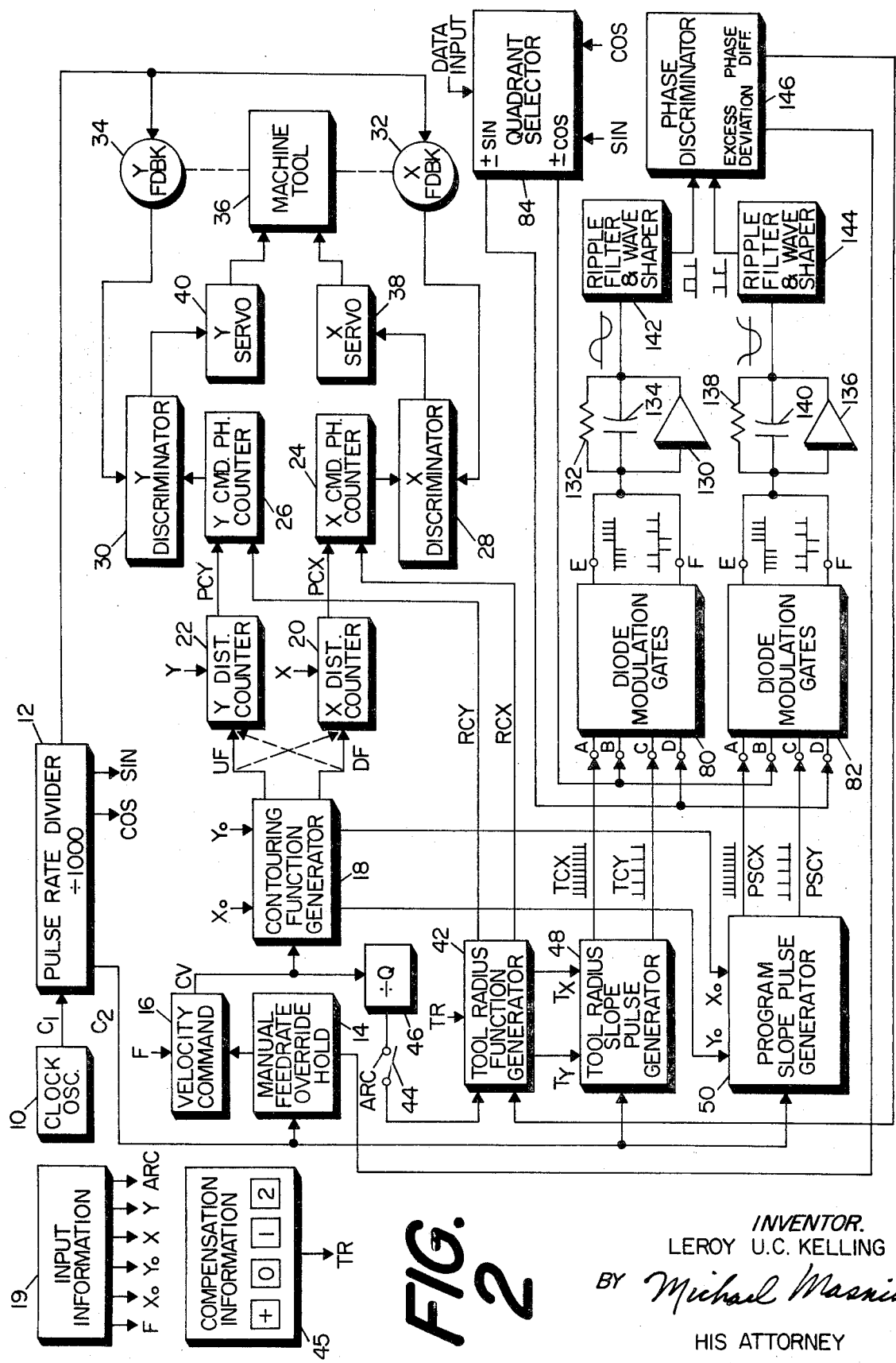
FIG. 2 is a detailed block diagram of a second embodiment of the novel contouring control system comprising the present invention.

Turning now to FIG. 2, there is shown a detailed block diagram of a second embodiment of the numerical contouring control system improvement comprising the present invention. The contouring control system of FIG. 2 is, for the most part, the same as that shown in FIG. 1 with the exception of the comparison means which are used to compare the outputs of the tool radius slope pulse generator 48 and the program slope pulse generator 50. To the extent that the systems of FIGS. 1 and 2 are the same, identical circuitry is shown and the reference numerals used in these two figures correspond.

It will be recalled from the discussion of the system of FIG. 1 that one of the essential aspects of the numerical contouring control system of the present invention is the comparison means connected to the function generators 48, 50 to compare the pulse trains which emanate therefrom to assure that the tool radius vector is substantially aligned with the angle of the commanded path.

In the embodiment of FIG. 2, the two output signals from the tool radius slope pulse generator 48 are fed to a first pulse modulating means such as the diode modulation gates 80. Similarly, the two pulse trains from the program slope pulse generator 50 are fed to second pulse modulating means such as the diode modulation gates 82. In addition to the outputs of their associated function generators 48, 50 the diode modulation gates 80, 82 have additional inputs which come from the quadrant selector 84. The quadrant selector 84 is, in turn, connected to the pulse rate divider 12 so as to receive first and second modulation frequency signals such as the sine and cosine signals shown in FIG. 2. Finally, the quadrant selector 84 is also connected to the input information means 19 so as to receive relative information indicative of the particular quadrant in which the commanded contouring path is to be generated.

Figure 3:
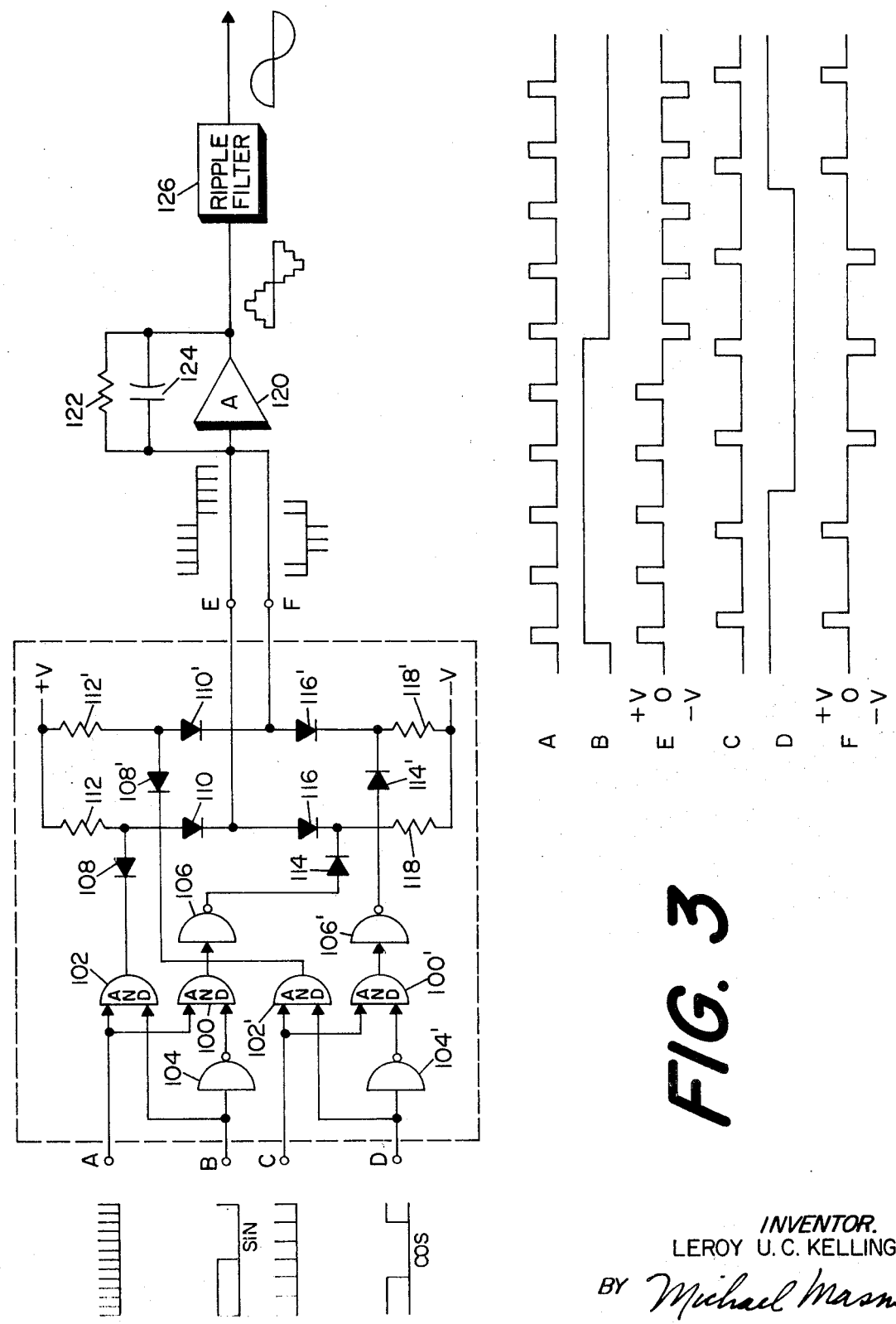
FIG. 3 is a detailed circuit diagram and a series of waveforms illustrating a particular embodiment (and the operation thereof) of the diode modulation gates of FIG. 2.

The diode modulation gates 80, 82 are shown in detail in FIG. 3 and the quadrant selector 84 is illustrated in FIG. 4. However, for the moment, it suffices to say that the diode modulation gates 80, 82 act to modulate the signals on their A and C inputs by the signals on their B and D inputs, respectively. That is, the pulse signal on the A input will be modulated by the modulation signal on the B input with the result of this modulation being fed to the E output terminal. Similarly, the pulse signal fed to the C input terminal will be modulated by the modulation signal fed to the D input terminal with the result of this modulation being fed to the F output terminal. The result of modulating a pulse frequency signal having a varying frequency wherein the pulses are the same width by a modulation signal of some type is to generate an output signal which is essentially of the same characteristic as the modulation signal insofar as frequency is concerned but varies in amplitude in proportion to the number of pulses present on the pulse frequency signal.

Turning then to FIG. 3, there is shown a detailed logic diagram of the diode modulation gates 80, 82 of FIG. 2. The diode modulation gate of FIG. 3 is in essence a pair of identical pulse modulation systems in that the portion of the diode modulation gates associated with input terminals A and B and output terminal E is identical to that associated with input terminals C and D and output terminal F.

A brief explanation of the pulse modulation system of FIG. 3 will now be given. Basically, the pulse modulation system of FIG. 3 includes first and second voltage sources labeled +V and −V which comprise substantially constant voltages of different level. In the particular embodiment of FIG. 3, the two voltage sources are equal but opposite in polarity. The pulse modulation system of FIG. 3 also includes input switching means mad up of two AND gate 100, 102 and their associated inverters 104, 106. The function of the input switching means is to switch one or the other of the two voltage sources to the output terminal E depending upon the state of the input signals present at input terminals A and B. That is, if there is a pulse present on input terminal A, one of the voltage sources will be switched to output terminal E when the modulation signal on input terminal B is in one state whereas the other voltage source will be switched to output terminal E each time there is a pulse present on each input terminal A and the modulation signal on input terminal B is in the other state.

Specifically, by reference to FIG. 3, the positive voltage source +V will be switched to output terminal E whenever there is a pulse present on input terminal A and the modulation signal on input terminal B is in the logic "1" state. Conversely, the negative voltage source −V will be switched to output terminal E when there is a pulse present on input terminal A and the modulation signal on input terminal B is in the logic "0" state. For the purposes of the embodiment of FIG. 3, logic "1" will re represented by some positive voltage and logic "0" will be represented by ground or zero volts.

The detailed operation of the switch means of FIG. 3 will now be given. Input terminal A which receives the pulse signal to be modulated is connected to one of the inputs of AND gates 100, 102. The other input of AND gate 102 is connected directly to input terminal B which receives the modulation signal and the second input to AND gate 100 is connected through inverter 104 to input terminal B. If there is a pulse present on input terminal A, the first input to AND gate 102 will be a logic "1." Similarly, if the modulation signal present on input terminal B is at the logic "1" level, both inputs to AND gate 102 are then at logic "1" and therefore the output of AND gate 102 is a logic "1." From the foregoing, it will be recalled that under these circumstances the modulation system of FIG. 3 should switch the positive voltage +V to output terminal E.

The output of AND gate 102 is connected to the cathode of a first switching diode 108. The anode of diode 108 is connected to the anode of a second diode 110. This junction point is, in turn, connected to a resistor 112 which is connected to the positive voltage source +V. Assuming that the positive voltage source +V is somewhere nearly the same as the positive voltage level used for logic "1" it will be apparent that diode 108 will be back biased whenever the output of AND gate 102 is a logic "1." Under these circumstances, current will flow from the positive voltage source +V through resistor 112 and diode 110 to output terminal E. This, of course, assumes that output terminal E is connected to some lower voltage level which is the case in the system of FIG. 3 since output terminal E is connected to the input of an operational amplifier 120. Thus, under the foregoing circumstances, the positive voltage source +V will be switched to output terminal E.

On the other hand, when the modulation signal at input terminal B goes to logic "0" the output of AND gate 102 also changes to logic "0." Actually, the AND gate 102 and inverter 106 are designed to have a logic "0" voltage level a few volts negative of zero volts to facilitate a clean switching of the current in the resistors 112 and 118. Since this makes the output of AND gate 102 at effectively negative volts, it will be apparent that the voltage source +V will now be switched through resistor 112 and diode 108 to the negative volt level present at the output of AND gate 102. Thus, it can be seen that the positive voltage +V is no longer being switched to output terminal E when the modulation signal at input terminal B goes to logic "0."

It will, however, be recalled that under these circumstances (a pulse present at input terminal A and a logic "0" at input terminal B) the negative voltage source −V should now be switched to output terminal E. This takes place by virtue of the fact that input terminal B is connected through inverter 104 to the second input of AND gate 100 so that the output of AND gate 100 will, at this time, become a logic "1." The output of AND gate 100 is, in turn, connected to inverter 106 whose output will now be a logic "0" or a negative voltage level. The output of inverter 106 is connected to the anode of diode 114 whose cathode is in turn connected to the cathode of diode 116. The junction of these two diodes is connected via resistor 118 to the negative voltage source −V. If the output of inverter 106 is a logic "0" at this time, diode 114 will be back biased so that the minus voltage source −V will be switched through resistor 118 and diode 116 to output terminal E. Thus, under these circumstances, it can be seen that the negative voltage source −V is switched to the output terminal E.

The remainder of the modulation system of FIG. 3 for modulating pulses at input C by the modulation signal at input terminal D and feeding the results of this modulation output terminal F is exactly the same as that described with respect to input terminals A and B and output terminal E. For this reason, identical elements have been labeled with identical reference numerals with the addition of primes.

The operative effect of the pulse modulation scheme of FIG. 3 is to generate an output signal F(t) which can be expressed in terms of the frequency A of the input pulse frequency signal and the modulation signal f(t) as follows:

$$F(t) = A \times f(t). \quad (1)$$

That is, the output signal will have a frequency and phase identical to the frequency and phase of the modulation signal f(t) and an amplitude proportional to the frequency A of the pulse frequency signal.

In more concrete terms, assume that the modulation signal f(t) is a sine wave, sin 0. The output signal then becomes:

$$F(t) = A \sin 0 \quad (2)$$

It is, of course, somewhat awkward to speak of the "amplitude" of a signal such as that shown in waveform F of FIG. 3. However, if this signal is integrated, as it is by operational amplifier 120, the result is a true amplitude varying signal.

The way in which the pulse modulation system of FIG. 3 operates to assist in comparing the outputs of the function generators 48, 50 can be seen by assuming that the two pulse frequency signals at input terminals A and C are being modulated by two modulation signals having the same frequency but a fixed phase difference. The two modulation signals may be, for example, sin O at input terminal B and cos O at input terminal D. If the respective frequencies of the pulse signals at input terminals A and C are represented by the letters A and C it will be apparent that the signals at output terminals E and F will be:

$$E = A \sin O \quad (3)$$

$$F = C \cos O \tag{4}$$

The signals from output terminals E and F are fed to the input of operational amplifier 120. Operational amplifier 120 may be any of several wellknown types of inverting amplifiers with theoretically infinite open loop gain and a relatively high input impedance. Operational amplifier 120 has a feedback resistor 122 and a capacitor 124 tied from its output back to the input. If the RC time constant of resistor 122-capacitor 124 is relatively long with respect to the width of the input pulses, this connection will serve to make amplifier 120 serve as a summing and smoothing amplifier with some fixed phase shift. Since the phase shift remains substantially constant it can be seen that the output of amplifier 120 will be:

$$O = A \sin O + C \cos O \tag{5}$$

It can be shown that the foregoing trigonometric relation reduces to:

$$O = A^2 + C^2 \sin(\arctan A/C + O) \tag{6}$$

Thus, the overall effect of the pulse modulation system of FIG. 3 is to generate an output sinusoidal signal which varies in phase as a function of the frequency of the two input pulse signals $A$ and $C$.

Finally, the pulse modulation system of FIG. 3 may also include a ripple filter 126 which serves to further smooth the output of operational amplifier 120.

Referring back, then, to FIG. 2 it will be seen that diode modulation gate 80 has a first summing means such as the amplifier 130, including its feedback resistor 132 and capacitor 134 connected to output terminals E and F of diode modulation gate 80. Similarly, output terminals E and F of diode modulation gate 82 are connected to second summing means such as amplifier 136 with its associated feedback resistor 138 and capacitor 140.

From the foregoing description of the operation of the diode modulation gates 80, 82 in conjunction with their associated amplifiers 130, 136 respectively it will be seen that the output of operational amplifier 130 will be an essentially sinusoidal signal which varies in phase as a function of the two output frequencies TCX and TCY of the tool radius slope pulse generator 48. Similarly, the output of operational amplifier 136 will be a sinusoidal signal whose phase varies as a function of the two output signals PSCX and PSCY of the program slope pulse generator 50.

It will be recalled that the outputs of function generators 48, 50 should be equal whenever the tool radius vector is aligned with the angle of the commanded path. If the outputs of these two function generators are, in fact, equal then the outputs from operational amplifiers 130, 136 will be in phase. On the other hand, any difference between the outputs from function generators 48, 50 will result in some phase difference between the outputs of operational amplifiers 130, 136. Thus, the outputs of function generators 48, 50 can be compared by phase comprising the outputs of operational amplifiers 130, 136.

Before phase discriminating the outputs of operational amplifiers 130, 136 they may be fed through ripple filter and wave shapers 142, 144 respectively. The function of these ripple filter and wave shaper currents is to further smooth the outputs of operational amplifiers 130, 136 and then to amplify and clip these output signals so as to provide uniform square wave signals for more positive phase comparison. For this reason, the output of the ripple filter and wave shapers 142 and 144 are fed to a phase discriminator 146. The phase discriminator 146 may be of any well known type and operates to generate an output signal proportional to the phase difference between the two signals applied at its input terminals. It will be recalled that the existence of a phase difference indicates that the outputs of the two function generators 48, 50 are not equal. This means that the tool radius vector must be modified so as to align it with the angle of the commanded path. For this reason, the "PHASE DIFFERENCE" output of the phase discriminator 146 is connected to the tool radius function generator 42 so that any phase difference will be used to generate output signals to rotate the tool vector and bring the tool vector in line with the angle of the commanded path. In this way, the system of FIG. 2, like the system of FIG. 1, operates to continuously keep the tool radius function generator 42 in synchronism with the contouring function generator 18 so as to properly offset the cutting tool.

It will also be recalled from the operation of the system of FIG. 1 that large differences in the angle of successive angles of contoured path may require special treatment. That is, it may be necessary to inhibit machine operation until such time as the tool radius vector is more nearly in line with the angle of the new path segment. This is accomplished in the system of FIG. 2 by a second output from phase discriminator 146 labeled "EXCESS DEVIATION." This output is used to indicate when the phase discriminator 146 has ascertained that the phase difference between its two input signals is in excess of some predetermined amount. Under these circumstances, this output signal from phase discriminator 146 is connected to the manual feedrate override 14 so as to inhibit generation of any further contouring velocity pulses until such time as the tool radius vector is realigned with the angle of the commanded path.

Referring now to FIG. 4, there is shown a detailed logic diagram of the quadrant selector 84 of FIG. 2. A brief examination of equation (6) hereinbefore shows that utilization of any two fixed sine-cosine waves by the diode modulation gates 80, 82 results in a phase shift of the outputs of operational amplifiers 130, 136 which is limited to 90°. Therefore, it is necessary to recognize the particular quadrant in which the next segment of the commanded path takes place and to appropriately select between plus or minus cosine and plus or minus sine wave for the input to the diode modulation gates 80, 82. This selection is accomplished by the quadrant selector circuit of FIG. 4.

A brief reference to FIG. 4 shows that a path segment in the first quadrant calls for modulation signals of plus sine and plus cosine. A path segment in the second quadrant calls for modulation signals of plus sine and minus cosine and so on. Therefore, one can select the desired modulation signals by looking at the input data relative to each block and selecting the necessary signals accordingly. The circuit of FIG. 4, therefore, shows two input switches 150, 152 which are used to represent the present state of the input data so as to indicate the quadrant in which the machine tool is presently operating. Switches 150, 152 are exemplary only since this type of data would ordinarily be stored in storage registers or other locations of the control system. The input signals plus sine, minus sine, plus cosine, and minus cosine are connected to four AND gates 154, 156, 158, 160, respectively. The outputs of AND gates 154, 156 are connected to the inputs of OR gate 162, whereas the output of AND gates 158, 160 are connected to the inputs of OR gate 164. In this way, the appropriate sine and cosine signals can be selected as to assure that the diode modulation gates 80, 82 are able to effect a full 360 degree phase shift representative of the input data.

Although the present invention has been described with respect to several particular embodiments, the principles underlying this invention will suggest many additional modifications of these particular embodiments to those skilled in the art. Therefore, it is intended that the appended claims shall not be limited to the specific embodiments shown, but rather shall cover all such modifications as fall within the true spirit and scope of the present invention.

What is claimed as new and desired to be secured by Letters Patent of the United States is:

1. In a contouring control system for producing relative motion along a commanded path between a cutting tool and a workpiece, the system including (1) input information means for commanding the speed of said relative motion and first and second directional components of the commanded path to be followed along respective axes, (2) a master clock oscillator for synchronizing system operation, (3) a velocity command generator coupled to the input information means and the master clock oscillator for producing contouring velocity pulses at a rate indicative of the speed of said relative motion, (4) a contouring function generator coupled to the velocity command generator and the input information means for resolving the contouring velocity pulses into the first and second components of pulses having respective rates which indicate the direction of the commanded path relative to axes, (5) compensating information input means for indicating the required amount of compensation resulting from deviation in cutting tool dimensions, (6) a compensating function generator coupled to said velocity command and to said compensating information input means for resolving said contouring velocity pulses into first and second components of pulses having respective rates indicative of the information received from said compensating information input means, said compensating function generator responsive to said compensation information input to resolve the magnitude of said input into first and second directional components along respective axes, said contouring function generator and said compensating function generator both changing the rates of their respective pulses relative to changes in the angle of the commanded path, (7) means for setting said contouring function generator and said compensating function generator in initial and similar conditions, (8) means coupled to said contouring function generator and said compensating function generator for combining said first components of pulses to produce first result pulses for effective movement along one of said two axes and (9) means coupled to said contouring function generator and said compensating function generator for combining said second components of pulses to produce second resultant pulses for effecting movement along the other of said two axes, the improvement comprising:

a. a third function generator operatively connected to said compensating function generator and the master clock oscillator for generating first and second pulse trains respectively proportional to said first and second directional components along respective axes;

b. a fourth function generator operatively responsive to said input information means and to the master clock oscillator for generating third and fourth pulse trains respectively proportional to the first and second directional components of said input information;

c. comparison means operatively connected to said third and fourth function generators for comparing the angle represented by said first and second pulse trains with the angle represented by said third and fourth pulse trains; and d. modifying means operatively connected to said comparison means for modifying the information stored in the compensating function generator whenever the output of said comparison means indicates that the angle represented by said first and second trains is not equal to the angle represented by said third and fourth pulse trains.

2. The system improvement recited in claim 1 wherein said comparison means is operatively connected to said third and fourth function generators for comparing the combined total of said first and fourth pulse trains with the combined total of said second and third pulse trains, and said modifying means is operatively connected to said comparison means for modifying the information stored in the compensating function generator whenever the output of said comparison means indicates that the combined total of said first and fourth trains is not equal to the combined total of said second and third pulse trains.

3. The contouring control system improvement recited in claim 1 further comprising deviation sensing means operatively connected to said comparison means for generating an output signal whenever the difference between the combined total of said first and fourth trains exceeds the combined total of said second and third pulse trains by more than a predetermined amount and means for operatively connecting the output of said deviation sensing means to the velocity command generator so as to prohibit the generation of contouring velocity pulses so long as there is an output signal from said deviation sensing means.

4. The contouring control system improvement recited in claim 2 wherein said comparison means comprises a reversible digital counter operatively connected to said third and fourth function generators.

5. The contouring control system improvement recited in claim 3 wherein said comparison means comprises a reversible digital counter operatively connected to said third and fourth function generators.

6. The contouring control system improvement recited in claim 4 wherein said modifying means comprises a pulse rate multiplier operatively connected to said comparison means for generating a fifth pulse train whose frequency is proportional to the contents of said reversible counter.

7. The contouring control system improvement recited in claim 5 wherein said modifying means comprises a pulse rate multiplier operatively connected to said comparison means for generating a fifth pulse train whose frequency is proportional to the contents of said reversible counter 8. The contouring control system improvement of claim 1 further comprising modulation signal generating means operatively connected to said master clock oscillator for generating first and second modulation frequency signals having a fixed phase difference therebetween and wherein said comparison means include a first pulse modulating means operatively connected to said third function generator and to said modulating signal generating means, said first pulse modulating means being operative to modulate said first pulse train by said first modulation frequency signal and to modulate said second pulse train by said second modulation frequency signal and a second pulse modulating means operatively connected to said fourth function generator and said modulation signal generating means, said second pulse generating means being operative to modulate said third pulse train by said first modulating frequency signal and to modulate said fourth pulse train by said second modulating frequency signal.

9. The contouring control system improvement recited in claim 8 further comprising deviation sensing means operatively connected to said comparison means for generating an output signal whenever the difference between the angle represented by said first and second trains and the angle represented by said third and fourth pulse trains exceeds a predetermined amount and means for operatively connecting the output of said deviation sensing means to the velocity command generator so as to prohibit the generation of contouring velocity pulses so long as there is an output signal from said deviation sensing means.

10. The contouring control system improvement recited in claim 8 further comprising a first summing means operatively connected to said first pulse modulating means to sum said modulated output signals so as to generate a first phase varying output signal whose phase is proportional to said first and second pulse trains and the second summing means operatively connected to said second pulse modulating means to sum said modulated output signals so as to generate a second phase varying output signal whose phase is proportional to said third and fourth pulse trains.

11. The contouring control system improvement recited in claim 9 further comprising a first summing means operatively connected to said first pulse modulating means to sum said modulated output signals so as to generate a first phase varying output signal whose phase is proportional to said first and second pulse trains and the second summing means operatively connected to said second pulse modulating means to sum said modulated output signals so as to generate a second phase varying output signal whose phase is proportional to said third and fourth pulse trains.

12. The contouring control system improvement of claim 10 further comprising a phase discriminating means operatively connected to said first and second summing means and being operative to examine said first and second phase varying signals and generate an output signal proportional to the phase difference therebetween.

13. The contouring control system improvement of claim 11 further comprising phase discriminating means operatively connected to said first and second summing means and being operative to examine said first and second phase varying signals and generate an output signal proportional to the phase difference therebetween.

14. The contouring control system improvement recited in claim 12 wherein said first and second summing means comprise first and second summing amplifiers.

15. The contouring control system improvement recited in claim 13 wherein said first and second summing means comprise first and second summing amplifiers.

16. An arrangement for controlling the relative positioning of the tool and a workpiece comprising a source of reference signals having a given frequency, a source of command signals having a given frequency and phase with respect to the reference signals, a first function generator producing first and second coordinate pulses describing the workpiece surface to be generated in terms of pulse recurrence rate and accumulated number of pulses, a second function generator producing first and second coordinate pulses describing the offset of the center of the tool to be used in generating the workpiece surface in terms of the relative time of occurrence of the recurrent pulses and their rate of recurrence, said command signal source responsive to an algebraic function of said first function generator and second function generator pulses to vary the relative phase of said reference and command signals, means for controlling the relative positioning of said two objects in accordance with the relative phase of said reference and command signals, means for rotating the angles associated with said first and second function generator pulses at the same angular velocity when said first function generator is generating a circular function, and means for rotating the angle associated with said second function generator pulses into agreement with the angle associated with said first function generator pulses whenever the difference in angles associated with said first and second function generator pulses exceeds a predetermined valve.

* * * * *